US008825266B2

(12) United States Patent
Naderhirn et al.

(10) Patent No.: US 8,825,266 B2
(45) Date of Patent: Sep. 2, 2014

(54) SYSTEM AND METHOD FOR PREVENTING A COLLISION

(75) Inventors: Michael Naderhirn, Linz (AT); Peter Langtaler, Linz (AT)

(73) Assignee: EADS Deutschland GmbH, Ottobrunn (DE)

( * ) Notice: Subject to any disclaimer, the term of this patent is extended or adjusted under 35 U.S.C. 154(b) by 363 days.

(21) Appl. No.: 12/737,439

(22) PCT Filed: Jul. 15, 2009

(86) PCT No.: PCT/EP2009/059113
§ 371 (c)(1),
(2), (4) Date: Mar. 14, 2011

(87) PCT Pub. No.: WO2010/007115
PCT Pub. Date: Jan. 21, 2010

(65) Prior Publication Data
US 2011/0160950 A1    Jun. 30, 2011

(30) Foreign Application Priority Data

Jul. 15, 2008  (DE) .......................... 10 2008 033 128
Mar. 6, 2009  (AT) ................................ A 372/2009

(51) Int. Cl.
*G01C 22/00*   (2006.01)
*G08G 5/04*    (2006.01)
*G05D 1/02*    (2006.01)

(52) U.S. Cl.
CPC .............. *G05D 1/0202* (2013.01); *G08G 5/045* (2013.01)
USPC ................ 701/28; 701/301; 342/70; 342/109

(58) Field of Classification Search
USPC ............... 701/301, 300, 23, 28, 45, 1, 27, 96; 340/903; 180/167–169; 342/70, 109, 342/59, 357.31; 367/96, 909
See application file for complete search history.

(56) References Cited

U.S. PATENT DOCUMENTS

| | | | |
|---|---|---|---|
| 6,097,996 A | 8/2000 | Deker | |
| 6,173,219 B1 | 1/2001 | Deker | |
| 6,424,889 B1 | 7/2002 | Bonhoure et al. | |
| 6,785,610 B2 * | 8/2004 | Baker et al. | 701/301 |
| 8,280,622 B2 | 10/2012 | Meunier et al. | |
| 8,467,953 B2 | 6/2013 | Naderhirn | |
| 2002/0152029 A1 | 10/2002 | Sainthuile et al. | |
| 2008/0288169 A1 | 11/2008 | Meunier et al. | |
| 2010/0256909 A1 * | 10/2010 | Duggan et al. | 701/301 |

FOREIGN PATENT DOCUMENTS

| | | |
|---|---|---|
| FR | 2 893 146 | 5/2007 |
| WO | WO 01/46766 A1 | 6/2001 |
| WO | WO 2001/46766 A1 | 6/2001 |
| WO | WO 2009/040064 A1 | 4/2009 |

* cited by examiner

Primary Examiner — Thomas G Black
Assistant Examiner — Luke Huynh
(74) Attorney, Agent, or Firm — Muirhead and Saturnelli, LLC (57) ABSTRACT

Controlling a vehicle to automatically prevent the vehicle from colliding with obstacles includes identifying and locating obstacles in front of the vehicle, wherein relative position of an obstacle is determined; measuring relative speed of the obstacles; assessing whether there is a risk of a collision between the vehicle and the obstacle as a function of the relative position and relative speed. If there is a risk of a collision, the method further includes: calculating an unsafe region around the obstacle as a function of known measurement errors; calculating an evasion point within or on an edge of the unsafe region; defining a protection zone around the evasion point; defining an evasion route which is in the form of a circular path and has a predefined radius of curvature; controlling the vehicle at a critical distance, so that the vehicle follows the evasion route which is tangential to the protection zone.

41 Claims, 8 Drawing Sheets

θ ... elevation angle
ψ ... azimut angle
R ... distance between vehicle and obstacle
v ... relative velocity of obstacle

Fig. 8c  exit path ER is blocked

SYSTEM AND METHOD FOR PREVENTING A COLLISION

TECHNICAL FIELD

This application relates to a system and a method for automatically avoiding collisions of a vehicle with further objects. The system or the method, respectively, may be applied for automatic collision avoidance of unmanned controllable aircraft with other aircraft or stationary obstacles.

BACKGROUND

It would be desirable to provide a system and a method for controlling a vehicle, which ensures reliable avoidance of stationary or moving obstacles by the vehicle. Possible collisions are to be prevented. In the following the term "vehicle" refers to vessels (i.e. ships), submersibles (i.e. submarines), aircraft (i.e. planes) as well as spacecraft (i.e. space ship).

SUMMARY

One embodiment of the system described herein relates to a method for controlling a vehicle to automatically avoid collisions of the vehicle with obstacles. The method includes the following steps: detecting and localizing obstacles in front of the vehicle, whereby the relative position of the obstacles with respect to the vehicle is given by its coordinates; measuring the relative velocity of the detected obstacles; assessing, if there is a risk of collision between the vehicle and the obstacles dependent upon the respective relative position and of the relative velocity; performing the following steps, if a risk of collision exists: computing a domain of uncertainty around the obstacles dependent upon known measurement errors; computing an avoidance point at a boundary of the domain of uncertainty; defining a protection zone having a radius around the avoidance point; defining a circular exit path of a given curve radius; navigating the vehicle at a critical distance from the obstacle such that the vehicle follows the circular exit path, wherein the circular exit path is tangent to the protection zone.

Another embodiment of the system described herein relates to a system for obstacle detection and for computing an avoidance maneuver in a vehicle. The system includes the following components: an autopilot unit for controlling the movement of the vehicle, the autopilot unit including an interface for receiving motion parameters, the motion parameters describing a target movement of the vehicle, the autopilot unit being adapted to navigate the vehicle on the basis of the motion parameters such that the actual movement of the vehicle is approximately equal to the target movement; a sensor unit having at least one environmental sensor, the environmental sensor being adapted to detect an obstacle and to provide sensor data which are dependent upon the relative position of the obstacle and the relative velocity of the obstacle; a data processing unit adapted to process the sensor data and to provide measured values for the relative position and the relative velocity; a unit for computing the avoidance maneuver adapted to compute motion parameters for a target movement of an avoidance maneuver based upon the measured values, and adapted to provide these motion parameters to the interface of the autopilot unit.

Another embodiment of the system described herein relates to a method for obstacle detection and for computing an avoidance maneuver in a vehicle. The method including the following steps: locating an obstacle by means of a first environmental sensor and providing of corresponding sensor data representing the relative position and the relative velocity of the obstacle; processing the sensor data and providing measured values of the relative position and the relative velocity; computing motion parameters for a target movement of an avoidance maneuver on the basis of the measured values; and applying these motion parameters to an interface of an autopilot unit for navigating the movement of the vehicle, the autopilot unit being adapted to navigate the vehicle such that the actual movement approximately equals the target movement.

BRIEF DESCRIPTION OF THE DRAWINGS

The following Figures and the further description is intended to provide guidance in understanding the system described herein. Elements of the Figures are not necessarily to be understood in a restrictive manner. Instead, emphasis is being placed upon illustrating the principle of the system described herein. In the figures like reference numerals indicate corresponding parts.

FIGS. 9*a,b* illustrate in an exemplary manner the relations between a moving and non-cooperative obstacle and the measured and the computed parameters;

DETAILED DESCRIPTION OF VARIOUS EMBODIMENTS

A system for secure navigation and for collision avoidance commonly fulfills two different tasks: Firstly, planning the route of the vehicle which is to be controlled from its present position to a given waypoint, and secondly, continually detecting obstacles on that route and, if necessary, commencing an avoidance maneuver. The first task (route planning in accordance with waypoints) is usually performed in advance, i.e. route planning is not happening during the ride, but rather prior to departure, or, in case of an aircraft, prior to take-off (pre-flight planning). The second task (detecting and avoiding obstacles) is to be performed continually during the ride, or the flight respectively. In case an priori unknown obstacle is detected in the area of the planned rout, a decision must be made, whether or not avoidance is required. If avoidance becomes necessary, an appropriate avoidance maneuver is to be planned and the pre-flight planned route is being departed from. Upon completion of the avoidance maneuver, the new route toward the next waypoint of the originally planned route is computed.

Upon obstacle detection, said obstacle is classified and an appropriate avoidance maneuver is computed. The classification is performed with respect to stationary and moving obstacles, or cooperative and non-cooperative obstacles respectively. A cooperative obstacle attempts to avoid an obstacle on its own, according to the same principle as the vehicle/aircraft in question, whereas non-cooperative obstacles ignore the vehicle/obstacle. There may be distinguished three classes of obstacles. First stationary obstacles clearly always being cooperative, second moving and non-cooperative obstacles, and third moving and cooperative obstacles. The methods for computing avoidance maneuvers belonging to the three classes are very similar and based on the same principle. For the sake of simplicity, avoidance for a stationary obstacle is described at first. The vehicle (e.g. aircraft) navigated by means of the system described in the following is also referred to as "own vehicle".

The procedure for computing an exit path for collision avoidance is as follows: It is assumed that the distance toward obstacles fall below a certain minimum value ($R_{RISK}$). Around smaller local obstacles, a circular security area (having the radius $R^0_{RISK}$) may be assumed, which the vehicle (e.g. aircraft) must not penetrate. In order to account for the sampling time $\Delta T$ between two measurements, the radius $R^0_{RISK}$ may still be increased for the distance which the own vehicle covers at a velocity $v_i$ within the sampling time $\Delta T$ ($R_{RISK}=R^0_{RISK}+v_i \cdot \Delta T$). The area in front of the vehicle, within which the vehicle is moving and is going to move and in which obstacles may occur in the short term and upon which a reaction must be made, is continually monitored by means of an on-board sensor unit. In case an obstacle is detected, an exit path of the own vehicle, the exit path bypassing the obstacle, is calculated. The exit path is composed of a circular arc (having the radius ρ) and optionally composed of a straight line, wherein the straight line tangentially connects to the circular arc, and wherein said circular arc tangentially connects to the movement track of the own vehicle prior to initiation of the avoidance maneuver. The radius ρ of the circular arc equals a minimum curvature radius of the exit path, the curvature radius being dependent upon the respective velocity. The own vehicle is being navigated according to the pre-computed exit path at the latest, if otherwise the penetration of the own vehicle in the security area around a detected obstacle cannot be prevented, wherein the exit path is then tangent to the security area.

Figure 1:
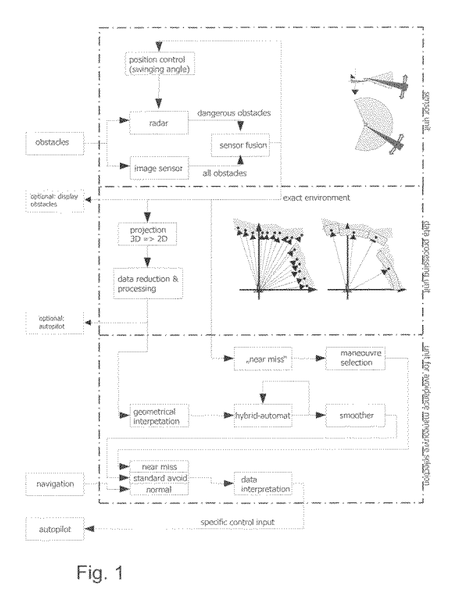
FIG. 1 is a block diagram illustrating an example of the system according to that described herein, the system including a sensor unit, a data processing unit, and a unit for computing an avoidance maneuver.

Before elaborating upon the avoidance methods in particular, the overall system shall at first be explained. In exemplary system according to the system described herein is schematically illustrated in FIG. 1. In order to allow to control the system for obstacle detection and for computing avoidance maneuvers in a vehicle, the system comprises an autopilot unit which controls the vehicle movement. The autopilot unit may comprise an interface for receiving motion parameters. The motion parameters describe a vehicle target movement and the autopilot unit navigates the vehicle dependent upon said motion parameters, such that its actual movement is approximately equal to the target movement. In case of an aircraft such motion parameters commonly include the angular adjustment of the pitch elevator and of the rudder, or also defaults for the rolling angle, tilting angle, and yaw angle, or angular velocities respectively.

The system further includes a sensor unit having at least one first environmental sensor adapted to localize an obstacle, and adapted to provide sensor data dependent upon the relative position of the obstacle and upon the relative velocity of the obstacle. The first environmental sensor may, for example, be an optical sensor, particularly a camera. Cameras operating in the visible range or in the infrared range may be applied.

As a further component the system may comprise a data processing unit adapted to process the sensor data, and adapted to provide measured values for the relative position and the relative velocity of the localized obstacles for continued processing. Data processing may be a data reduction or a mathematical reduction of the three-dimensional reality into a two-dimensional model. A more detailed description of this projection shall be presented further below (see description of FIG. 3).

According to FIG. 1, the system may include as a third component a unit for computing an avoidance maneuver. This unit may be integrated in the autopilot unit. For aviation purposes, however, it may be economically advantageous to use a autopilot unit already aviation-certified, said autopilot unit having a defined external interface. Application in aviations, only the system is to be certified, but not the autopilot. The unit for computing an avoidance maneuver is adapted to compute motion parameters dependent upon the measurement values for the relative position and the relative velocity for a target movement of an avoidance maneuver, and adapted to provide said motion parameters to the interface of the autopilot unit.

A potential obstacle is commonly located in a distance $R_{SENSE}$ in front of the vehicle aligned in a direction defined by the Azimut Angle Ψ and the elevation angle θ. The environmental sensor (camera, radar sensor) thereby registers the area in front of the vehicle and determines the distance $R_{SENSE}$, the Azimut Angle Ψ, the elevation angle θ, and the relative velocity v of the considered obstacle and provides these quantities as sensor data for further processing.

In order to achieve measurement results of higher accuracy, the sensor unit may include as a second environmental sensor a radar sensor. In this case, the sensor unit is adapted to conflate sensor data of the first and the second sensor ("sensor fusion"), and adapted to thereupon compute from information contained in the sensor data the Azimut Angle Ψ, the elevation angle θ, the distance $R_{SENSE}$, and the relative velocity v of the obstacle.

The sensor unit may detect and classify potential obstacles by means of image data generated by the camera. If, for example, the obstacle is an aircraft, the aircraft type may be determined by means of the image. Based upon this classification, the actual size of the considered obstacle (aircraft) may be determined from a data base. From the actual size of each obstacle and its image size the distance between the considered obstacle and the vehicle may be calculated. The Azimut Angle Ψ, too, and the elevation angle θ may be deduced from the position of the obstacle within the camera image.

Figure 2:
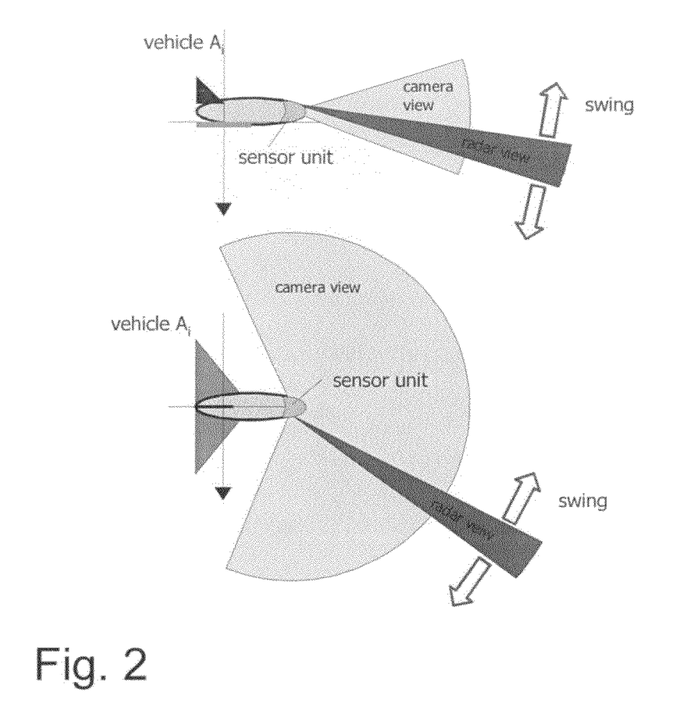
FIG. 2 illustrates the actual structure of the sensor unit having a camera and a radar sensor for determining the relative position and the relative velocity of obstacles.

A higher measurement accuracy may be achieved, if the relative position, particularly the direction (i.e. Azimut Angle and elevation angle) of the obstacle is determined approximately (coarsely) by means of image processing methods from the camera image and thereupon swinging the radar sensor in the direction of the considered obstacle, the radar sensor merely having a considerably lower field of view. Then, the relative position and the relative velocity may be measured by means of the radar sensor comprising a higher accuracy than the approximate measurements using a camera. The sensor unit, particularly the field of view of the camera and the swinging radar sensor are both illustrated in FIG. 2.

If there are numerous obstacles discernible on the camera image, the sensor unit is able to detect and classify potential obstacles according to their "danger". Most dangerous is the one vehicle, whose collision probability is highest due to its relative position and due to its relative velocity with respect to the vehicle. In many cases, particularly in aviation, the obstacle which is closest to the center of a potential circular exit path may be rated as the most dangerous object. This center is either left, or right respectively, of the own vehicle in a normal distance toward the present flight path, the normal distance equaling the cure radius of the circular exit path. The sensor is aligned to the very object which has been classified most dangerous.

As mentioned hereinbefore, the system according to FIG. 1 includes a data processing unit, which may be adapted to project the relative position of an obstacle in a horizontal plane in order to determine the horizontal distance and in order to provide this horizontal distance as a measured value for the relative position. By means of such projection the real three-dimensional problem is reduced to a two-dimensional problem. This reduction, too, is appropriate for aviation or for subsea nautics, since for the sake of efficiency avoidance maneuvers are commonly performed on one particular altitude without escaping upward or downward (notwithstanding exceptional situations, where an emergency avoidance maneuver has to be initiated). Such avoidance maneuvers would consume a lot more energy than avoidance maneuvers within one plane. The horizontal distance $R_{PROJ}$ thereupon results from the actually measured distance $R_{SENSE}$ by multiplying with the cosine of the elevation angle $\theta$. Computation of the horizontal velocity $v_{PROJ}$ is effected accordingly.

Another task of the data processing unit is data reduction, so long as numerous obstacles are detected. The relative position of each obstacle is associated with a domain of uncertainty, i.e. with a measurement error related to the distance $R_{SENSE}$, and with a measurement error related to angles $\Psi$ and $\theta$. If several obstacles are located in close vicinity to each other, or if a very large obstacle is detected (i.e. a wall), then several measuring points may be conflated, and for said conflated obstacles a common relative position with a correspondingly increased domain of uncertainty may be calculated.

A regular avoidance maneuver cannot be performed, if an obstacle suddenly—i.e. top down or bottom up—moves in front of the vehicle, the obstacle then being situated closer than a critical distance $R_{RISK}$ in the area in front of the vehicle. An approach of the obstacle cannot be observed in this very case: the object literally appears all of a sudden within the visual field of the sensor unit. Like cases are being referred to as "near miss" and require an emergency avoidance maneuver, which may be initiated to the right and to the left, as well as upward and downward, and wherein the maximum loads of the vehicle may be exceeded for a short duration.

The unit for computing an avoidance maneuver may further include a unit for classifying the obstacle. This unit is adapted to classify the obstacle on the basis of measurement data, in order to therefrom deduce the obstacle behavior. By means of this classification it is being determined from the sensor data, if the obstacle is a stationary (non-moving) object, a moving and cooperating object, or a moving and non-cooperating object. By cooperating object is to be understood an object accounting for pre-defined rules (i.e. the same rules as the own vehicle) and accounting for avoidance behavior. A non-cooperative object ignores the vehicle and maintains its present travel path. Dependent upon the relative position and the relative velocity (i.e. those components thereof, which have been projected into the horizontal plane), and dependent upon the classification result, motion parameters for an exit path are calculated and provided to the interface of the autopilot unit. The autopilot unit then controls corresponding actors (e.g. pitch elevators and rudders in an aircraft) such that it follows the computed exit path.

In FIGS. 3 through 7 the computation of the exit path is illustrated in more detail. The method for computing an exit path to automatically avoid collisions of the vehicle with obstacles includes the steps more closely described in the following and illustrated in FIGS. 3 through 7.

The basis of the computation is formed by the obstacle detection already described hereinbefore. In a first step localization of obstacles in front of the vehicle is performed, wherein the relative position of the obstacle with respect to the vehicle is defined by its coordinates (e.g. spherical coordinates: i.e. Azimut Angle, distance, elevation angle). The relative velocity of detected obstacles, too, is to be determined, which may happen using the radar sensor. Thereupon, an evaluation of the detected obstacles is performed, if there is a risk of collision between the vehicle and the respective obstacle dependent upon the respective relative position and relative velocity.

Figure 7:
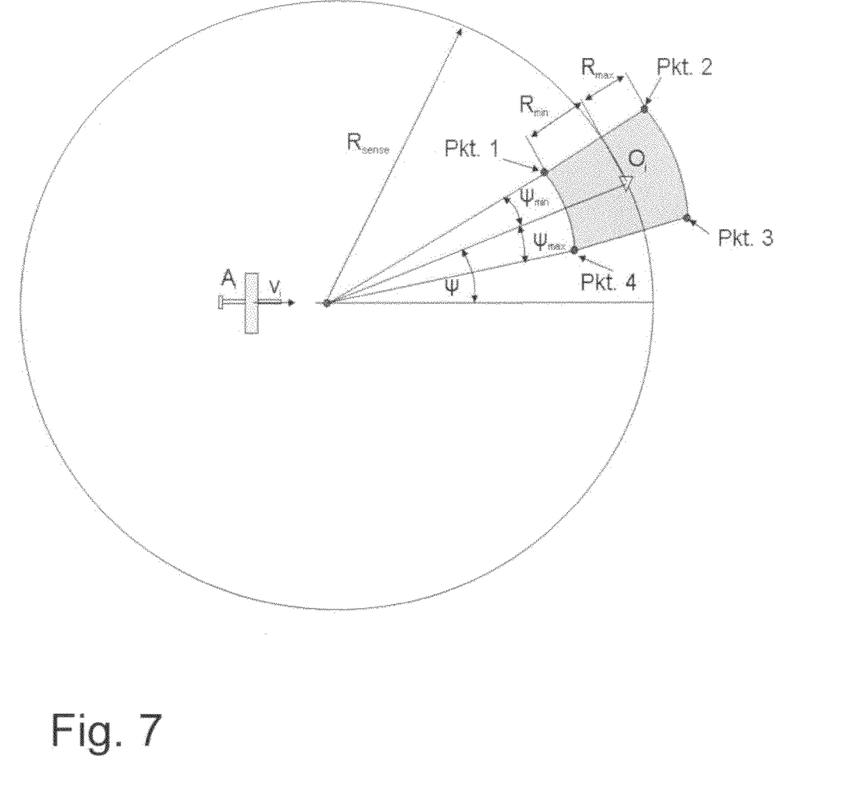
FIG. 7 illustrate the computation of a domain of uncertainty around an obstacle, wherein a vertex of the domain of uncertainty is selected as avoidance point.

If a risk of collision is recognized, a computation of an avoidance maneuver is performed as explained in the following:

A domain of uncertainty around the obstacle is computed dependent upon known measurement errors. For stationary obstacles such domain of uncertainty is shaped like circular ring segment. In FIG. 7 a domain of uncertainty around an obstacle at the nominal position $O_j$ is shown. The obstacle is located in a nominal distance $R_{SENSE}$ in front of the vehicle $A_i$ at an Azimut angle $\Psi$. The domain of uncertainty $\Gamma$ for the angles is the interval $$\Gamma=[\Psi-\Psi_{MIN},\Psi-\Psi_{MAX}]$$

and the domain of uncertainty $\Sigma$ for the distance $$\Sigma=[R_{SENSE}-R_{MIN},R_{SENSE}+R_{MAX}].$$

The overall domain of uncertainty is the circular ring segment formed by the points "point 1", "point 2", "point 3", and "point 4". The Cartesian coordinates (x-coordinate, y-coordinate) of those four points are calculated as follows:

point 1: $[(R_{SENSE}-R_{MIN})\cos(\Psi-\Psi_{MIN}),(R_{SENSE}-R_{MIN})\sin(\Psi-\Psi_{MIN})]$, point 2: $[(R_{SENSE}+R_{MAX})\cos(\Psi-\Psi_{MIN}),(R_{SENSE}+R_{MAX})\sin(\Psi-\Psi_{MIN})]$, point 3: $[(R_{SENSE}+R_{MAX})\cos(\Psi+\Psi_{MAX}),(R_{SENSE}-R_{MIN})\sin(\Psi+\Psi_{MAX}),]$, and point 4: $[(R_{SENSE}-R_{MIN})\cos(\Psi+\Psi_{MAX}),(R_{SENSE}-R_{MIN})\sin d(\Psi+\Psi_{MAX})]$.

As seen from the vehicle "point 4" is located farthest to the right and is the very point which is closest to the centre of the circular exit path when avoiding an obstacle. Thus, an obstacle at this outermost point of the domain of uncertainty would be most dangerous, if the criterion for the "danger" of obstacles as mentioned hereinbefore is considered. In order to ensure robust avoidance "point 4" must be avoided in the worst case. Robust refers to the case that the exit path is still secure when accounting for measurement errors and when maintaining a desired minimum distance toward the obstacle. Thus, point 4 is the very point which is avoided which is therefore referred to as avoidance point hereinafter. When avoiding leftward the avoidance point would be "point 1".

Figure 4:
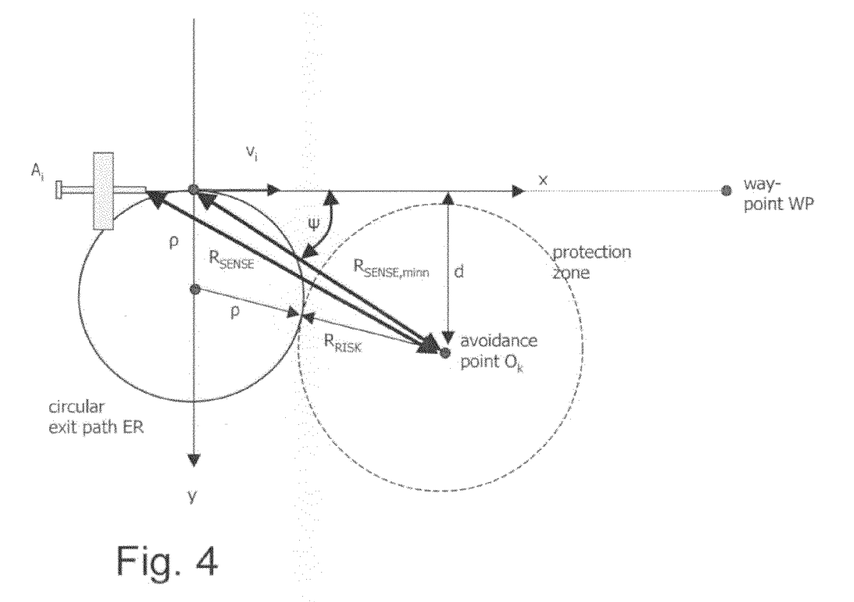
FIGS. 4-6 illustrate in an exemplary manner an embodiment of the method for avoiding and preventing collisions with stationary obstacles according to the system described herein.
Figure 5:
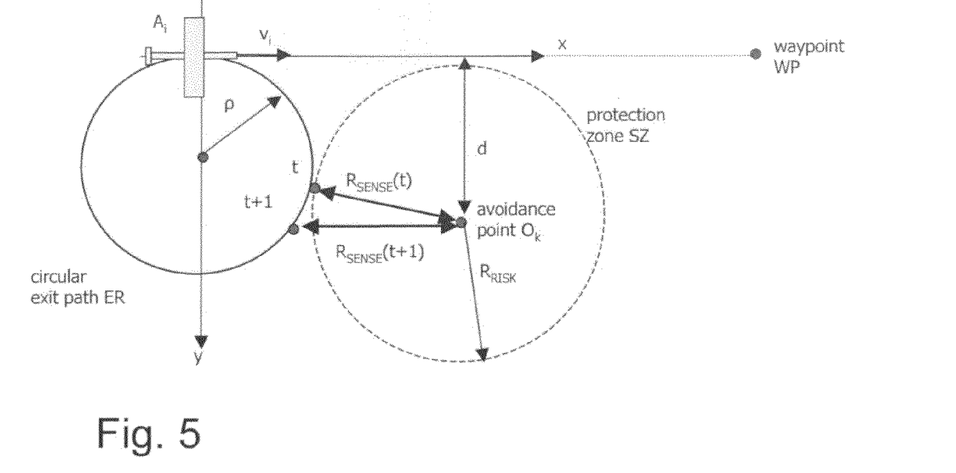
Figure 6:
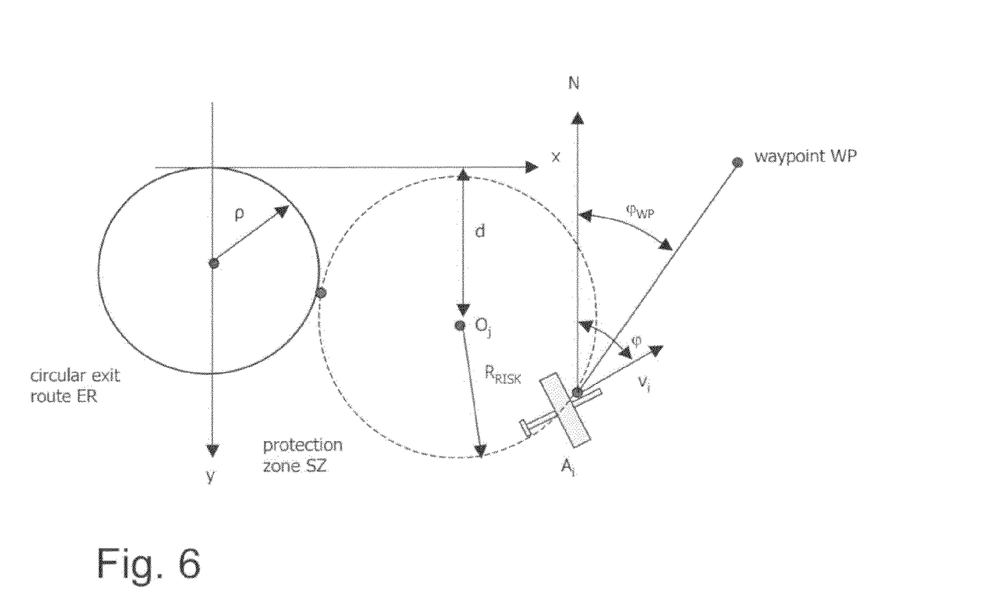

The further method is being explained referring to FIGS. 4 through 6, wherein for the sake of clarity the domain of uncertainty is no longer shown. There is merely illustrated the avoidance point which is indicated by $O_k$.

For stationary obstacles a circular protection area SZ having a radius $R_{RISK}$ around the avoidance point is defined. The vehicle is not supposed to penetrate said protection area SZ. Thus, it is ensured that the vehicle is not approaching the obstacle any closer than a minimum distance $R_{RISK}$. The vehicle always avoids the obstacle following an (approximately) circular exit path. This assumption being sufficiently accurate for the computation for aircraft, land vehicles, as well as ships. The circular path of the exit rout has the minimum possible radius $\rho$, which is known but depends upon the velocity of the vehicle. The distance toward the obstacle is being measured continually. At a critical distance the avoidance maneuver is initiated (i.e. the autopilot is triggered with corresponding motion parameters) such that the circular exit path ER is tangent to the protection area SZ. The critical distance $R_{SENSE,MIN}$ (see FIG. 4) may be computed directly from the measured quantities. As a criterion for the initiation of an avoidance maneuver having become necessary for stationary obstacles may serve the following inequality:

$$2 \cdot \rho \cdot R_{RISK} + R_{RISK}^2 + 2 \cdot \rho \cdot R_{SENSE} \cdot \sin(\Psi) - R_{SENSE}^2 > 0, \quad (1)$$

wherein $\rho$ represents the radius of the exit path ER, $R_{RISK}$ the radius of a circular protection are (protection zone) around the obstacle, $\Psi$ the measured Azimut Angle of the obstacle at which the obstacle is observed, and $R_{SENSE}$ the measured distance between the obstacle and the vehicle. For the distance $R_{SENSE}$ and the Azimut Angle $\Psi$ worst case values ($R_{SENSE,MIN}$, $\Psi + \Psi_{MAX}$) are used in order to render the computation robust against measurement uncertainties. Expressed in mathematical terms this means:

$$R_{SENSE} = \min\{\Sigma\}, \text{ and}$$

$$\sin(\Psi) = \max\{\sin(\Gamma)\}.$$

In other words: an avoidance maneuver must then be initiated, if at least for one combination of ($R_{SENSE} \in \Sigma$) and ($\Psi \in \Gamma$) the inequality (1) is satisfied. Proceeding likewise is robust against measurement uncertainties when measuring the position of the obstacle. There may be shown that this "worst case" always occurs at minimum distance $R_{SENSE}$ and maximum Azimut Angle $\Psi$.

Figure 3:
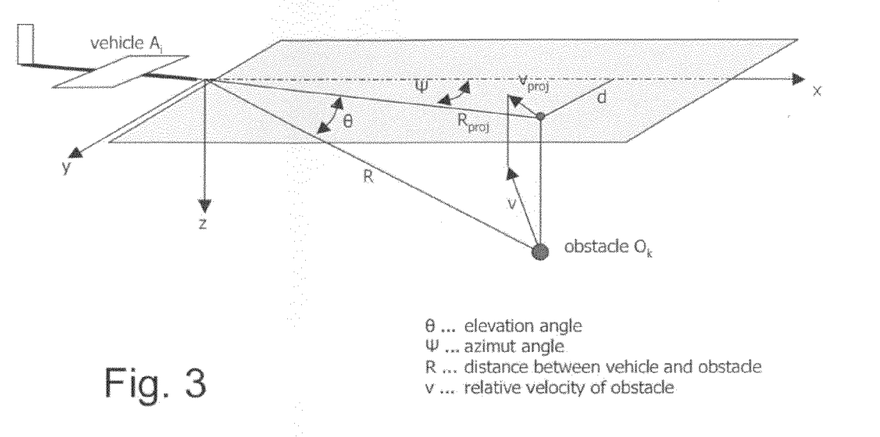
FIG. 3 illustrates a projection of a distance vector and of a velocity vector in a horizontal plane in which the vehicle is moving, the projection being performed by the data processing unit.

As already mentioned hereinabove the quantities (ref. FIG. 3) projected into the horizontal plane are utilized for computing the critical distance $R_{SENSE,MIN}$. Once an obstacle is detected satisfying inequality (1), the avoidance maneuver is initiated; i.e. the vehicle/aircraft is navigated on a circular exit path having the radius $\rho$.

Upon initiation of the avoidance maneuver the vehicle $A_i$ follows the circular exit path. Thereby the distance toward the obstacle is measured continually. Once the distance $R_{SENSE}$ (t+1) at a time instant t+1 exceeds the value at a previous time instant t ($R_{SENSE}(t+1) > R_{SENSE}(t)$), i.e. the vehicle moves away from the obstacle, a counter movement may be initiated, in order to reach the original destination being the waypoint WP (see FIG. 5). The vehicle is navigated along the circular protection zone until the (angular) distance between angle $\phi$ of the flight course with respect to the northern compass direction and the angle $\phi_{WP}$ of the waypoint with respect to the northern direction compass falls below a pre-defined threshold value. Thereafter, the standard waypoint navigation, e.g. as common in aviations, is re-activated.

Figure 8A:
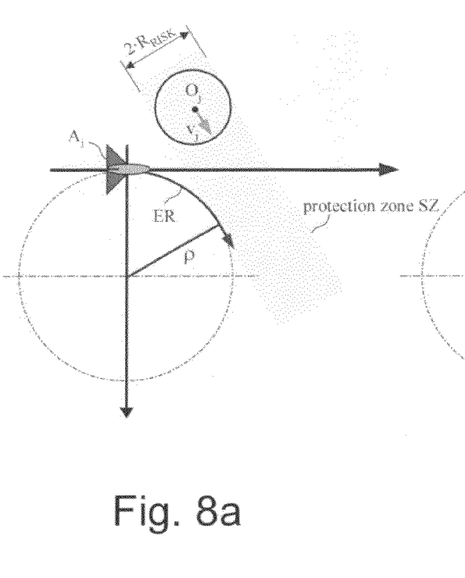
FIGS. 8*a-c* illustrate in an exemplary manner an embodiment of the method for avoiding and preventing collisions for moving and non-cooperative obstacles according to the system described herein.
Figure 8B:
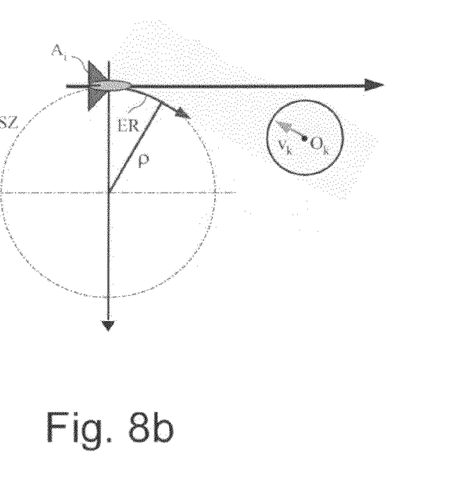

Moving and non-cooperative obstacles are characterised in that they ignore the navigated vehicle/aircraft, i.e. in that they continue their present movement straightaway. The protection zone which is circular for stationary obstacles is being moved along for moving obstacles. Therefore, for a straight movement, this protection zone is a corridor whose width equals the diameter of the circular protection zone of a stationary obstacle, i.e. $2 \cdot R_{RISK}$. A schematic diagram including a moving obstacle $O_j$ having a measured velocity $v_j$, and with a navigated vehicle (aircraft) $A_i$ having a velocity $v_i$, and with a corridor-shaped protection zone SZ around the obstacle $O_j$, and with a circular exit path ER of the vehicle $A_i$ tangent to the protection zone is shown in FIG. 8a. In FIG. 8b a similar illustration is depicted including a further moving and non-cooperative obstacle $O_k$.

Once a moving obstacle $O_j$, $O_k$, $O_l$ is detected (see FIGS. 8a-c), it is determined, if a collision is imminent, because of the velocity vectors $v_j$, $v_k$, $v_l$ and the own velocity $v_i$ of the navigated vehicle $A_i$. If so, a circular exit path ER is taken, wherein the method for computing said exit path is similar to the stationary obstacle (see FIGS. 4-6).

Figure 8C:
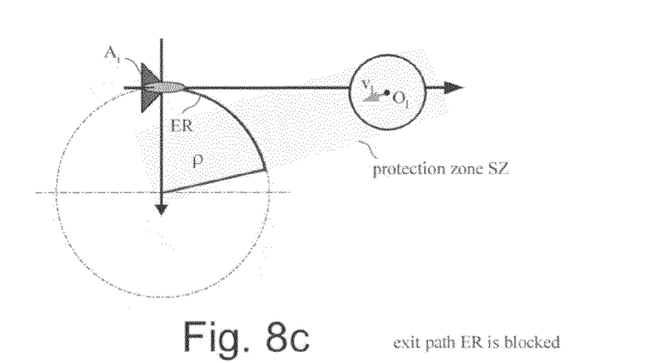

In the situations shown in FIGS. 8a and 8b, the exit path ER is tangent to the movement corridor (i.e. the protection zone) of obstacle $O_j$, or $O_k$ respectively, wherein in aviations, according to according to regulations valid in this field, the exit path always runs to the right as seen from the navigated vehicle. Contrary to stationary obstacles there is a chance in case of non-cooperative obstacles that the exit path in the pre-determined direction (e.g. to the right as common in aviations) through the movement corridor (i.e. the protection zone) is blocked. In this case (corridor interjects with exit path) a change of the "standard avoidance strategy" (e.g. exit to the right) becomes necessary. This situation is illustrated in FIG. 8c.

Figure 9:
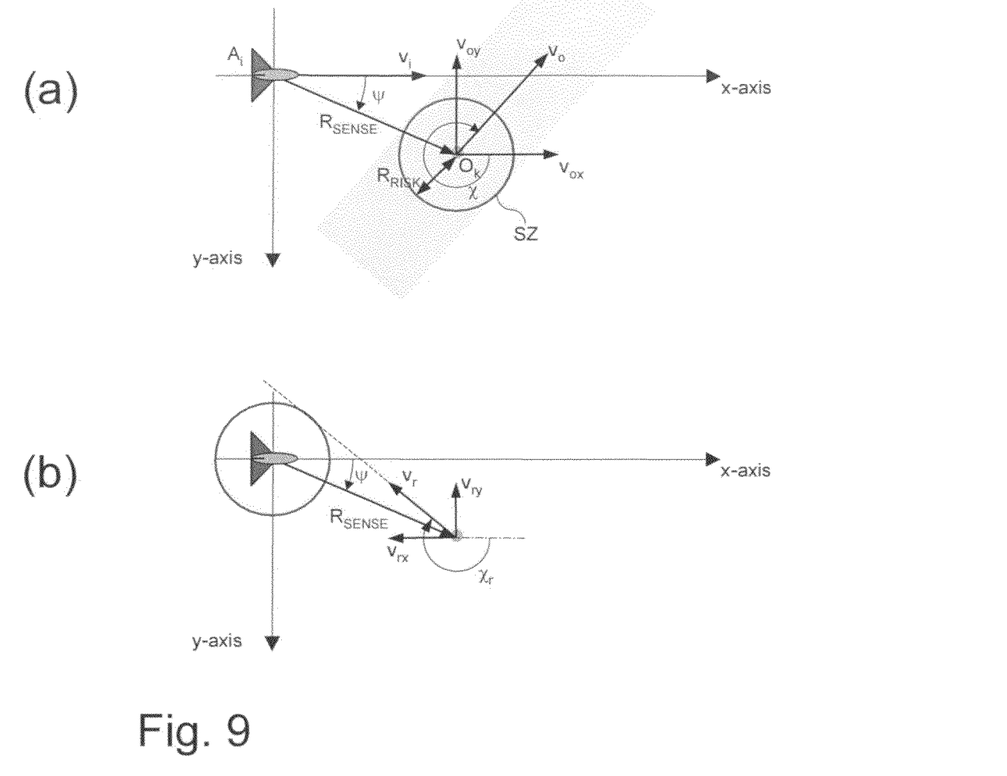

If a collision with a moving and non-cooperative obstacle is imminent may be determined by geometrical deliberations similar to those yielding equation (1). In FIG. 9a the detection of a moving obstacle $O_k$ is illustrated. By means of vehicle/aircraft on-board sensors described hereinbefore following quantities are measured: velocity vector $v_0$ (axial and lateral components $v_{0x}$, $v_{0y}$), distance $R_{SENSE}$ between vehicle $A_i$ and obstacle $O_k$, Azimut Angle $\Psi$, and own velocity $v_i$ of the navigated vehicle. Similar to the avoidance of stationary obstacles a circular area around the object is $O_k$ defined, which the vehicle $A_i$ must not penetrate. The circular area also defines the width of the corridor in which the obstacle is moving. The angle between the x-axis, which lies per definition in the direction of motion of the navigated vehicle, and the velocity vector $v_0$ of the obstacle is indicated by the symbol X. The representation shown in FIG. 9a is drawn in a stationary coordinate system. This representation may be transferred into an equivalent representation using a coordinate system which moves along with the vehicle/aircraft, which is shown in FIG. 9b. In this representation the velocity of the vehicle/aircraft equals zero, the relative velocity of the obstacle is denoted $v_r$ (having components $v_{rx}$, $v_{ry}$) and the angle between x-axis and the relative velocity vector is denoted $X_r$. In order to attain a criterion of whether a collision is imminent, the relative position of a line g defined by the relative velocity vector and an imaginary circle k around the vehicle having the radius $R_{RISK}$ is considered. If line g intersects circle k, a collision is imminent. This relation between line g and circle k may be described mathematically by means of inequality $$\sin(\Psi - X_r) - (R_{RISK}/R_{SENSE})^2 > 0. \quad (2)$$

In case this inequality is satisfied, a collision is imminent. The angle $X_r$ may be calculated by $$v_{rx}/v_{ry}=\cot(X_r)=\kappa, \quad (3)$$

wherein the relative velocities are governed by:

$$v_{rx}=v_{ox}-v_{ix}, v_{ry}=v_{oy}-v_{iy}.$$

In so far as the x-coordinate lies in the direction of motion of the vehicle/aircraft $A_i$, the component $v_{iy}$, however, always equals zero.

Inequality (2) is valid for ideally accurate measurement values. In order to account for measurement uncertainties a "worst case" consideration is performed; i.e. a minimum of the left-hand expression of inequality (2) is searched for. Thus, the new criterion reads $$\min\{\sin^2(\Delta)-(R_{RISK}/\Sigma)^2\}>0, \quad (4)$$

wherein $\Sigma=[R_{SENSE,MIN}, R_{SENSE,MAX}]$ and $\Delta=[\delta_{min}, \delta_{max}]$ for $\delta_{min}=\min(\Gamma)-\max(A)$ and $\delta_{max}=\max(\Gamma)-\min(A)$, and wherein A represents the domain of uncertainty around $X_r$ ($A=[X_{r,min}, X_{r,max}]$, resulting from known measurement errors).

Figure 10:
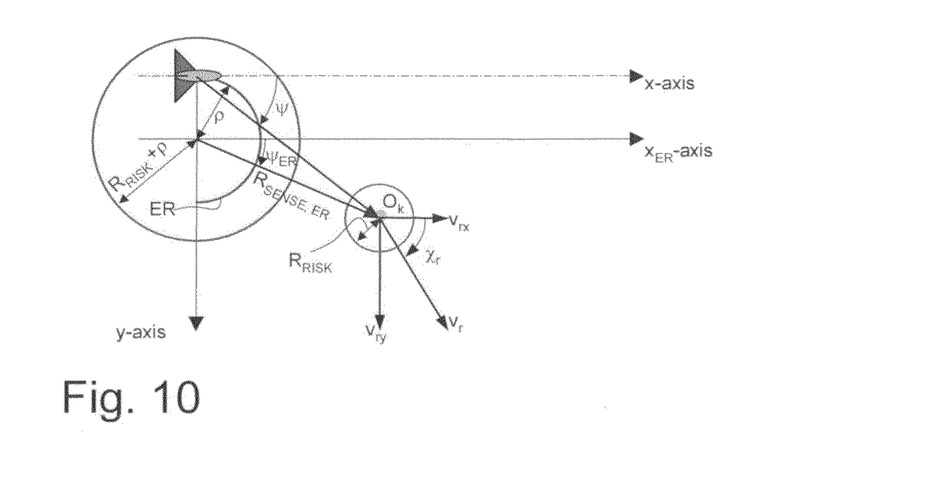
FIG. 10 illustrates in an exemplary manner a coordinate transformation for computing the exit path for a moving and non-cooperative object.

Above criteria of inequalities (2) and (4) facilitate a decision on whether or not a collision is imminent. If so, and at which latest possible time instant avoidance is still possible, is not tested therein. In cases in which the corridor is sufficiently removed from the vehicle/aircraft such that avoidance along a circular path, which just touches the corridor, is possible (see FIGS. 8a and 8b), a criterion for initiating the avoidance maneuver is deduced from inequality (4) by means of a coordinate transformation, the coordinate transformation being shown in FIG. 10. Corresponding inequality is $$\min\{\sin^2(\otimes_{ER})\}-((R_{RISK}+\rangle)/\min\{\copyright_{ER}\})^2>0, \quad (5)$$

wherein in comparison to inequality (4) the sum $R_{RISK}+\rangle$ is used instead of $R_{RISK}$, and instead of the areas © and ⊗ the corresponding transformed areas $\copyright_{ER}$ and $\otimes_{ER\ ER}$ are used, wherein:

$$\otimes_{ER}=[\min\{\wp_{ER}\}-\max\{A\},\max\{\wp_{ER}\}-\min\{A\}],$$

$$\wp_{ER}=\tan^{-1}((\copyright\cdot\sin(\wp)-\rangle)/(\copyright\cdot\sin(\wp))), \text{ and}$$

$$\copyright_{ER}=(\rangle^2+\copyright^2-2\cdot\copyright\cdot\rangle\cdot\cos(\square/2-\wp))^{0.5}.$$

An avoidance maneuver is to be initiated, if inequality (5) is satisfied for at least one of the combinations ($R_{SENSE,ER}\in\copyright_{ER}$), ($\neg ER \in \wp_{ER}$), and ($X_r \in A$).

Figure 11:
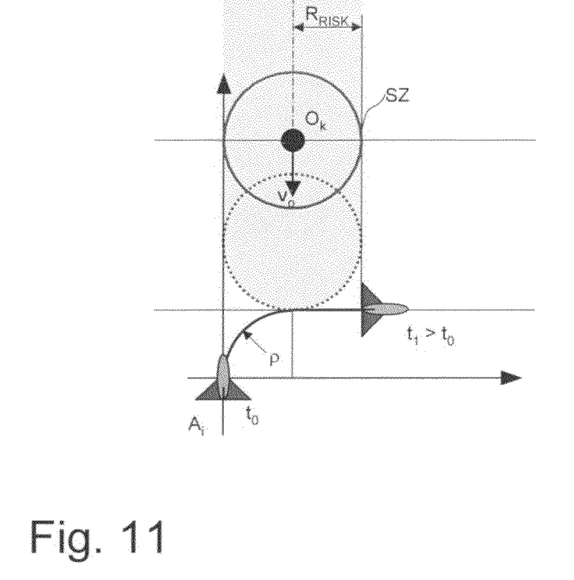
FIG. 11 illustrates an exit path intersecting the moving corridor of the obstacle.
Figure 12:
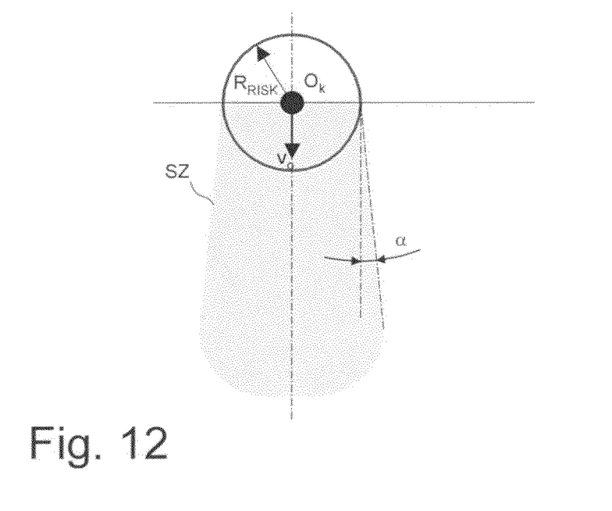
FIG. 12 illustrates the moving corridor of the obstacle considering obstacles.

Situations may occur, as for example shown in FIG. 8c, in which standard avoidance becomes impossible, the exit path through corridor SZ being blocked. In this case, the obstacle may be avoided in another direction as the standard direction or, if possible, the corridor in front of the obstacle is being traversed. This is possible, only if the time interval the vehicle/aircraft $A_i$ requires for leaving the corridor is less than or equal to the time interval the obstacle requires to approach the vehicle $A_i$ as close as a distance $R_{RISK}$. An example of this situation is shown in FIG. 11. Measurement uncertainties related to velocity measurement for moving obstacles result in that the movement corridor does not take a straight course (contrary to the ideal case shown in FIG. 11), but rather extends for $2\cdot\sin d(\langle)$ per unit of length, wherein $\langle$ represents the maximum uncertainty of the angle of the velocity vector $v_0$. This very situation is shown in FIG. 12.

Cooperative obstacles: In a third obstacle class there are moving and cooperative obstacles avoiding according to the same rules as the navigated vehicle. If the obstacle displays cooperative behaviour, ma, for example, be determined via radio link with the obstacle. This means that the obstacle-object and the navigated vehicle/aircraft must be "familiar" with each other. A criterion that an avoidance maneuver is to be initiated in case of a moving and cooperative obstacle may be given by means of the following inequality:

$$2\cdot\rangle\cdot R+R^2+2\cdot\rangle\cdot R_{SENSE}\cdot\sin(\neg)-R_{SENSE}^2>0, \quad (6)$$

wherein $R=R_{RISK}+\rangle$. In comparison to inequality (1) inequality (6) differs merely in that the variable $R_{RISK}$ (radius of protection zone) is replaced by the sum $R_{RISK}+\rangle$.

Another special case is represented by currents, for instance wind or water. For a constant current the vehicle is additionally moved with the constant velocity of the current in the direction thereof. In order to be able to describe the vehicle motion in an earth-fixed coordinate system, the velocity vector of the self-motion of the vehicle is added to the current velocity vector. Because of the current the vehicle moves at current speed with respect to the object even without self-motion.

In case of the presence of a current stationary obstacles may be treated as dynamic non-cooperative obstacles as the relative motion of the vehicle with respect to the stationary obstacle in a current is equivalent to a relative motion of the vehicle with respect to a dynamic and non-cooperative obstacle having a velocity directed opposite to the wind, the velocity having the same absolute value as the wind.

Using the method according to the system described herein stationary objects are being treated as dynamic and non-cooperative obstacles in the presence of currents, as the relative movement of the vehicle with respect to the stationary obstacle in a current is equivalent to the relative motion of the vehicle with respect to a dynamic and non-cooperative obstacle having a velocity directed opposite to the wind, but having the same absolute value.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method for controlling a vehicle to automatically avoid collisions of the vehicle with obstacles, the method comprising:
    detecting and localizing an obstacle in front of the vehicle, wherein relative position of the obstacle with respect to the vehicle is defined by relative coordinates;
    measuring the relative velocity with respect to the detected obstacle;
    evaluating a risk of collision of the vehicle with the obstacle dependent upon the current relative position and relative velocity;
    performing of the following steps, if there is a risk of collision with the obstacle:
    computing a domain of uncertainty around the obstacle dependent upon measurement errors;
    computing an avoidance point at a boundary of the domain of uncertainty;
    defining a protection zone having a radius around the avoidance point;
    defining a circular exit path of a given curve radius; and
    navigating the vehicle at a critical distance such that the vehicle follows the circular exit path, wherein the circular exit path is tangential to the protection zone, and wherein the detected obstacle is classified into one of three groups: namely a first group "stationary obstacles", a second group "moving and cooperating obstacles", and a third group "moving and non-cooperating obstacles", wherein cooperating obstacles follow pre-defined avoidance rules, and wherein non-cooperating obstacles ignore the vehicle and wherein, in case of stationary obstacles, four vertices of the stationary uncertainty domain are determined according to formulas:

point 1: $[(R_{SENSE}-R_{MIN})\cos(\Psi-\Psi_{MIN}),(R_{SENSE}-R_{MIN})\sin(\Psi-\Psi_{MIN})]$, point 2: $[(R_{SENSE}+R_{MAX})\cos(\Psi-\Psi_{MIN}),(R_{SENSE}+R_{MAX})\sin(\Psi-\Psi_{MIN})]$, point 3: $[(R_{SENSE}+R_{MAX})\cos(\Psi+\Psi_{MAX}),(R_{SENSE}-R_{MIN})\sin(\Psi P+\Psi_{MAX})]$, and point 4: $[(R_{SENSE}-R_{MIN})\cos(\Psi+\Psi_{MAX}),(R_{SENSE}-R_{MIN})\sin(\Psi+\Psi_{MAX})]$, wherein the domain of uncertainty is characterized by a nominal value $\Psi$, by $R_{SENSE}$ of the Azimut Angle, the distance, and corresponding uncertainty values $\Psi_{MIN}, \Psi_{MAX}, R_{MIN}, R_{MAX}$.

2. The method according to claim 1, wherein upon measuring the relative velocity with respect to the detected obstacle below and below a horizontal plane, the plane extending through the vehicle, the relative position, or the relative velocity respectively, are projected in the plane, and wherein the projected position or velocity, respectively, are used as measured values for computing the uncertainty domain, the avoidance point, and the protection zone.

3. The method according to claim 2, wherein, while the vehicle is situated on the circular route, the distance toward the obstacle is being measured, and wherein, if that distance toward the obstacle is increasing, the circular exit path is left and a contrary motion commences.

4. The method according to claim 3, wherein, upon having commenced the contrary motion, a route control in the direction of one waypoint is activated, if the absolute value of the angular difference between the waypoint and a compass direction and the vehicle and the compass direction is lower than a given threshold value.

5. The method according to claim 1, wherein for moving and cooperating obstacles the protection zone around the avoidance radius is increased.

6. The method according to claim 1, wherein the uncertainty domain, and thus also the avoidance point, is determined dependent upon the classification as stationary, moving and cooperating, and moving and non-cooperating obstacle.

7. The method according to claim 1, wherein the avoidance point is equal to point 4, if avoidance is to be performed in right direction, and wherein the avoidance point is equal to point 1, if avoidance is to be performed in left direction.

8. The method according to claim 7, wherein the avoidance point is determined according to the following rules:
when avoiding in right direction: point 4,
when avoiding in left direction: point 1.

9. A method for controlling a vehicle to automatically avoid collisions of the vehicle with obstacles, the method comprising:
detecting and localizing an obstacle in front of the vehicle wherein relative position of the obstacle with respect to the vehicle is defined by relative coordinates;
measuring the relative velocity with respect to the detected obstacle;
evaluating a risk of collision of the vehicle with the obstacle dependent upon the current relative position and relative velocity;
performing of the following steps, if there is a risk of collision with the obstacle:
computing a domain of uncertainty around the obstacle dependent upon measurement errors;
computing an avoidance point at a boundary of the domain of uncertainty;
defining a protection zone having a radius around the avoidance point;
defining a circular exit path of a given curve radius; and
navigating the vehicle at a critical distance such that the vehicle follows the circular exit path, wherein the circular exit path is tangential to the protection zone, and wherein the detected obstacle is classified into one of three groups: namely a first group "stationary obstacles", a second group "moving and cooperating obstacles", and a third group "moving and non-cooperating obstacles", wherein cooperating obstacles follow pre-defined avoidance rules, and wherein non-cooperating obstacles ignore the vehicle and wherein the protection zone is a movement corridor of the obstacle, the minimum width of the movement corridor being twice the width of the mandatory distance ($R_{RISK}$) toward the obstacle, wherein the corridor per unit length increases in width for $2\sin(\alpha)$, wherein $\alpha$ is the maximum angular error of the measured velocity vector of the obstacle.

10. The method according to claim 9, wherein the protection zone is a movement corridor of the obstacle, the width of the movement corridor being twice the mandatory minimum distance ($R_{RISK}$) toward the obstacle.

11. The method according to claim 9, wherein the protection zone defined by the corridor extends in front of obstacle the length of $R_{RISK}+v_0 t$, where $R_{RISK}$ is the mandatory minimum distance between the obstacle and the vehicle, $v_0$ is the measured velocity of the obstacle, and $t$ is the time period, which the vehicle on the exit path requires to depart from the corridor.

12. A method for controlling a vehicle to automatically avoid collisions of the vehicle with obstacles, the method comprising:
detecting and localizing an obstacle in front of the vehicle, wherein relative position of the obstacle with respect to the vehicle is defined by relative coordinates;
measuring the relative velocity with respect to the detected obstacle;
evaluating a risk of collision of the vehicle with the obstacle dependent upon the current relative position and relative velocity;
performing of the following steps, if there is a risk of collision with the obstacle:
computing a domain of uncertainty around the obstacle dependent upon measurement errors;
computing an avoidance point at a boundary of the domain of uncertainty;
defining a protection zone having a radius around the avoidance point;
defining a circular exit path of a given curve radius; and
navigating the vehicle at a critical distance such that the vehicle follows the circular exit path, wherein the circular exit path is tangential to the protection zone, and wherein the detected obstacle is classified into one of three groups: namely a first group "stationary obstacles", a second group "moving and cooperating obstacles", and a third group "moving and non-cooperating obstacles", wherein cooperating obstacles follow pre-defined avoidance rules, and wherein non-cooperating obstacles ignore the vehicle and wherein, for stationary obstacles, the critical distance is reached upon satisfying the following inequality for any Azimut Angle $\Psi$ of a domain of uncertainty Γ, and for any distance $R_{SENSE}$ of a domain of uncertainty Σ:

$$2 \cdot \rho \cdot R_{RISK} + R_{RISK}^2 + 2 \cdot \rho \cdot \Sigma \sin(\Gamma) - \Sigma^2 > 0,$$

wherein ρ represents the radius of the exit path and $R_{RISK}$ the radius of a circular protection zone.

13. A method for controlling a vehicle to automatically avoid collisions of the vehicle with obstacles, the method comprising:
  detecting and localizing an obstacle in front of the vehicle, wherein relative position of the obstacle with respect to the vehicle is defined by relative coordinates;
  measuring the relative velocity with respect to the detected obstacle;
  evaluating a risk of collision of the vehicle with the obstacle dependent upon the current relative position and relative velocity;
  performing of the following steps, if there is a risk of collision with the obstacle:
  computing a domain of uncertainty around the obstacle dependent upon measurement errors;
  computing an avoidance point at a boundary of the domain of uncertainty;
  defining a protection zone having a radius around the avoidance point;
  defining a circular exit path of a given curve radius; and
  navigating the vehicle at a critical distance such that the vehicle follows the circular exit path, wherein the circular exit path is tangential to the protection zone, and wherein the detected obstacle is classified into one of three groups: namely a first group "stationary obstacles", a second group "moving and cooperating obstacles", and a third group "moving and non-cooperating obstacles", wherein cooperating obstacles follow pre-defined avoidance rules, and wherein non-cooperating obstacles ignore the vehicle and wherein, for moving and cooperating obstacles, the critical distance is reached upon satisfying the following inequality:

$$2 \cdot \rho \cdot R + R^2 + 2 \cdot \rho \cdot R_{SENSE} \cdot \sin(\Psi) - R_{SENSE}^2 > 0,$$

wherein $R = \rho + R_{RISK}$ and ρ is the radius of the exit path, $R_{RISK}$ represents the radius of a circular protection zone, Ψ the measured Azimut Angle of the obstacle, and the $R_{SENSE}$ measured distance between obstacle and vehicle.

14. The method according to claim 13, wherein, for stationary obstacles, the critical distance is reached upon satisfying the following inequality for any Azimut Angle Ψ of a domain of uncertainty Γ, and for any distance $R_{SENSE}$ of a domain of uncertainty Σ:

$$2 \cdot \rho \cdot R_{RISK} + R_{RISK}^2 + 2 \cdot \rho \cdot R_{SENSE} \cdot \sin(\Psi) - R_{SENSE}^2 > 0,$$

wherein ρ represents the radius of the exit path and $R_{RISK}$ the radius of a circular protection zone.

15. A method for controlling a vehicle to automatically avoid collisions of the vehicle with obstacles, the method comprising:
  detecting and localizing an obstacle in front of the vehicle, wherein relative position of the obstacle with respect to the vehicle is defined by relative coordinates;
  measuring the relative velocity with respect to the detected obstacle;
  evaluating a risk of collision of the vehicle with the obstacle dependent upon the current relative position and relative velocity;
  performing of the following steps, if there is a risk of collision with the obstacle:
  computing a domain of uncertainty around the obstacle dependent upon measurement errors;
  computing an avoidance point at a boundary of the domain of uncertainty;
  defining a protection zone having a radius around the avoidance point;
  defining a circular exit path of a given curve radius; and
  navigating the vehicle at a critical distance such that the vehicle follows the circular exit path, wherein the circular exit path is tangential to the protection zone, and wherein the detected obstacle is classified into one of three groups: namely a first group "stationary obstacles", a second group "moving and cooperating obstacles", and a third group "moving and non-cooperating obstacles", wherein cooperating obstacles follow pre-defined avoidance rules, and wherein non-cooperating obstacles ignore the vehicle and wherein for stationary obstacles the critical distance is reached, if the following inequality is satisfied:

$$2 \cdot \rho \cdot R_{RISK} + R_{RISK}^2 + 2 \cdot \rho \cdot R_{SENSE} \cdot \sin(\Psi) - R_{SENSE}^2 > 0,$$

wherein ρ represents the radius of the exit path, $R_{RISK}$ the radius of a circular protection zone, Ψ the measured Azimut Angle of the obstacle, and $R_{SENSE}$ the measured distance between the obstacle and the vehicle.

16. A method for controlling a vehicle to automatically avoid collisions of the vehicle with obstacles, the method comprising:
  detecting and localizing an obstacle in front of the vehicle, wherein relative position of the obstacle with respect to the vehicle is defined by relative coordinates;
  measuring the relative velocity with respect to the detected obstacle;
  evaluating a risk of collision of the vehicle with the obstacle dependent upon the current relative position and relative velocity;
  performing of the following steps, if there is a risk of collision with the obstacle:
  computing a domain of uncertainty around the obstacle dependent upon measurement errors;
  computing an avoidance point at a boundary of the domain of uncertainty;
  defining a protection zone having a radius around the avoidance point;
  defining a circular exit path of a given curve radius; and
  navigating the vehicle at a critical distance such that the vehicle follows the circular exit path, wherein the circular exit path is tangential to the protection zone, and wherein the detected obstacle is classified into one of three groups: namely a first group "stationary obstacles", a second group "moving and cooperating obstacles", and a third group "moving and non-cooperating obstacles", wherein cooperating obstacles follow pre-defined avoidance rules, and wherein non-cooperating obstacles ignore the vehicle and wherein, for moving and non-cooperating obstacles, a collision is anticipated and wherein a collision is anticipated in that the inequality $$\sin(\Psi - X_r) - (R_{RISK}/R_{SENSE})^2 > 0$$

is being evaluated, and a risk of collision is assumed, if the inequality is not satisfied, wherein Ψ is the measured Azimut Angle of the obstacle, $R_{RISK}$ is the measured distance toward the obstacle, and $X_r$ is the angle included by the vector of the relative velocity of the obstacle and the direction of motion.

17. The method according to claim 16, wherein the domains of uncertainty of $\Psi$, $R_{SENSE}$, and $X_r$ are taken into account.

18. A method for controlling a vehicle to automatically avoid collisions of the vehicle with obstacles, the method comprising:
- detecting and localizing an obstacle in front of the vehicle, wherein relative position of the obstacle with respect to the vehicle is defined by relative coordinates;
- measuring the relative velocity with respect to the detected obstacle;
- evaluating a risk of collision of the vehicle with the obstacle dependent upon the current relative position and relative velocity;
- performing of the following steps, if there is a risk of collision with the obstacle:
- computing a domain of uncertainty around the obstacle dependent upon measurement errors;
- computing an avoidance point at a boundary of the domain of uncertainty;
- defining a protection zone having a radius around the avoidance point;
- defining a circular exit path of a given curve radius; and
- navigating the vehicle at a critical distance such that the vehicle follows the circular exit path, wherein the circular exit path is tangential to the protection zone, and wherein the detected obstacle is classified into one of three groups: namely a first group "stationary obstacles", a second group "moving and cooperating obstacles", and a third group "moving and non-cooperating obstacles", wherein cooperating obstacles follow pre-defined avoidance rules, and wherein non-cooperating obstacles ignore the vehicle and wherein, in case of currents, stationary obstacles are considered dynamic and non-cooperative obstacles have a relative velocity with respect to the vehicle, this relative velocity being directed opposite to the velocity of the currents, but its absolute value being equal to it.

19. A system for obstacle detection and for computing an avoidance maneuver in a vehicle, the system comprising:
- an autopilot unit for controlling the movement of the vehicle, the autopilot unit having an interface adapted to receive motion parameters, the motion parameters describing a target movement of the vehicle, and wherein the autopilot unit is adapted to navigate the vehicle dependent upon the motion parameters such that the actual movement of the vehicle approximately equals the target movement;
- a sensor unit having at least one environmental sensor adapted to detect an obstacle, and adapted to provide sensor data dependent upon relative position of the obstacle and the relative velocity of the obstacle;
- a data processing unit adapted to process the sensor data, and adapted to provide measured values for the relative position and the relative velocity; and
- a unit for computing an avoidance maneuver adapted to compote motion parameters for a target movement using the measured values, and to provide these motion parameters to the interface of the autopilot unit, wherein the sensor unit comprises a second environmental sensor and wherein the first environmental sensor is an optical sensor and the second environmental sensor is a radar sensor and wherein the sensor unit is adapted to conflate sensor data of at least the first and the second environmental sensor, and adapted to compute Azimut Angle, elevation angle, distance, and relative velocity of the obstacle from information comprised in the sensor data and wherein the first optical sensor is an area scan camera providing an image of the environment, and wherein the sensor unit is adapted to:
- detect and classify potential obstacles on the image,
- determine the actual size of the obstacles from a database on the basis of that classification, and
- compute the distance between the respective obstacle and the vehicle from the actual size of each obstacle and the image.

20. The system according to claim 19, wherein the relative position of the respective obstacle is a criterion for the danger of an obstacle, wherein the one obstacle is selected to be most dangerous, whose distance toward the center of the circular exit path is least.

21. The system according to claim 19, wherein the data processing unit is adapted to project the relative position of an obstacle in a horizontal plane, in order to determine the horizontal distance and provide it as measured value for the relative position.

22. A system for obstacle detection and for computing an avoidance maneuver in a vehicle, the system comprising:
- an autopilot unit for controlling the movement of the vehicle, the autopilot unit having an interface adapted to receive motion parameters, the motion parameters describing a target movement of the vehicle, and wherein the autopilot unit is adapted to navigate the vehicle dependent upon the motion parameters such that the actual movement of the vehicle approximately equals the target movement;
- a sensor unit having at least one environmental sensor adapted to detect an obstacle, and adapted to provide sensor data dependent upon relative position of the obstacle and the relative velocity of the obstacle;
- a data processing unit adapted to process the sensor data, and adapted to provide measured values for the relative position and the relative velocity; and
- a unit for computing an avoidance maneuver adapted to compote motion parameters for a target movement using the measured values, and to provide these motion parameters to the interface of the autopilot unit, wherein the unit for computing an avoidance maneuver comprises a unit for classifying the obstacle, the unit for classifying the obstacle being adapted to classify the obstacle on the basis of the measured data, in order to deduce the behavior of the obstacle thereof.

23. The system according to claim 22, wherein the obstacle is arranged in a particular azimut angle and in a particular elevation angle in front of the vehicle and the obstacle has a particular distance toward the vehicle, and wherein the environmental sensor captures a certain area in front of the vehicle, the environmental sensor providing the distance, the azimut angle, the elevation angle, and the relative velocity of the obstacle as sensor data.

24. The system according to claim 22, wherein the sensor unit comprises a second environmental sensor, wherein the first environmental sensor is an optical sensor and the second environmental sensor is a radar sensor.

25. The system according to claim 24, wherein the sensor unit is adapted to conflate sensor data of at least the first and the second environmental sensor, and adapted to compute Azimut Angle, elevation angle, distance, and relative velocity of the obstacle from information comprised in the sensor data.

26. The system according to claim 22, wherein the unit for classifying the obstacle is adapted to determine from the sensor data, if the obstacle is a stationary obstacle, a moving and cooperating obstacle, or a moving and non-cooperating obstacle.

27. The system according to claim 22, wherein the unit for computing an avoidance maneuver is adapted to provide motion parameters for the autopilot unit dependent upon the relative position and upon the relative velocity of the most dangerous obstacle, and dependent upon the result of the classification.

28. A system for obstacle detection and for computing an avoidance maneuver in a vehicle, the system comprising:
an autopilot unit for controlling the movement of the vehicle, the autopilot unit having an interface adapted to receive motion parameters, the motion parameters describing a target movement of the vehicle, and wherein the autopilot unit is adapted to navigate the vehicle dependent upon the motion parameters such that the actual movement of the vehicle approximately equals the target movement;
a sensor unit having at least one environmental sensor adapted to detect an obstacle, and adapted to provide sensor data dependent upon relative position of the obstacle and the relative velocity of the obstacle;
a data processing unit adapted to process the sensor data, and adapted to provide measured values for the relative position and the relative velocity; and
a unit for computing an avoidance maneuver adapted to compote motion parameters for a target movement using the measured values, and to provide these motion parameters to the interface of the autopilot unit, wherein the obstacle is arranged in a particular azimut angle and in a particular elevation angle in front of the vehicle and the obstacle has a particular distance toward the vehicle, and wherein the environmental sensor captures a certain area in front of the vehicle, the environmental sensor providing the distance, the azimut angle, the elevation angle, and the relative velocity of the obstacle as sensor data and wherein the sensor data for the relative position of each obstacle provided by the sensor unit are within a domain of uncertainty, and wherein the date processing unit is adapted to reduce the sensor data by conflating a number of obstacles which are located close to each other, and by computing a common relative position for conflated obstacles with a correspondingly increased domain of uncertainty.

29. A system for obstacle detection and for computing an avoidance maneuver in a vehicle, the system comprising:
an autopilot unit for controlling the movement of the vehicle, the autopilot unit having an interface adapted to receive motion parameters, the motion parameters describing a target movement of the vehicle, and wherein the autopilot unit is adapted to navigate the vehicle dependent upon the motion parameters such that the actual movement of the vehicle approximately equals the target movement;
a sensor unit having at least one environmental sensor adapted to detect an obstacle, and adapted to provide sensor data dependent upon relative position of the obstacle and the relative velocity of the obstacle;
a data processing unit adapted to process the sensor data, and adapted to provide measured values for the relative position and the relative velocity; and
a unit for computing an avoidance maneuver adapted to compote motion parameters for a target movement using the measured values, and to provide these motion parameters to the interface of the autopilot unit, wherein the unit for computing an avoidance maneuver is adapted to compute motion parameters for an emergency avoidance maneuver, if the distance of an obstacle is lower than a critical distance.

30. A method for detecting obstacles and for computing an avoidance maneuver in a vehicle, the method comprising:
locating an obstacle using a first environmental sensor and providing corresponding sensor data representing the relative position and relative velocity of the obstacle;
processing the sensor data and providing measured values for the relative position and for the relative velocity;
computing motion parameters for a target movement of an avoidance maneuver based upon the measured values; and
applying the motion parameters to an interface of an autopilot unit for controlling the movement of the vehicle, the autopilot unit being adapted to navigate the vehicle on the basis of the motion parameters such that the actual movement of the vehicle approximates the target movement, wherein the optical sensor is at least one area scan camera providing an image of the environment of the vehicle and wherein the first environmental sensor is an optical sensor providing an image of the environment; the method further comprising:
detecting and classifying potential obstacles on the image on the basis of the sensor data of the area scan camera;
determining the actual size of the obstacles from a database based upon the classification;
computing the distance between the respective obstacle and the vehicle form the actual size of each obstacle and the image; and
providing sensor data of a second environmental sensor being implemented as a radar sensor.

31. A method for detecting obstacles and for computing an avoidance maneuver in a vehicle, the method comprising:
locating an obstacle using a first environmental sensor and providing corresponding sensor data representing the relative position and relative velocity of the obstacle;
processing the sensor data and providing measured values for the relative position and for the relative velocity;
computing motion parameters for a target movement of an avoidance maneuver based upon the measured values;
applying the motion parameters to an interface of an autopilot unit for controlling the movement of the vehicle, the autopilot unit being adapted to navigate the vehicle on the basis of the motion parameters such that the actual movement of the vehicle approximates the target movement; and
measuring a distance, an azimuth angle, an elevation angle, and the relative velocity of the obstacle, wherein the distance, the azimuth angle, and the elevation angle represent the relative position of the obstacle in front of the vehicle, wherein the sensor data for the relative position of each obstacle are each within a domain of uncertainty; the method further comprising:
conflating a number of obstacles which are located close to each other;
computing a common relative position with a correspondingly increased domain of uncertainty for the conflated obstacles in order to reduce sensor data.

32. A method for detecting obstacles and for computing an avoidance maneuver in a vehicle, the method comprising:
locating an obstacle using a first environmental sensor and providing corresponding sensor data representing the relative position and relative velocity of the obstacle;
processing the sensor data and providing measured values for the relative position and for the relative velocity;
computing motion parameters for a target movement of an avoidance maneuver based upon the measured values;
applying the motion parameters to an interface of an autopilot unit for controlling the movement of the vehicle, the autopilot unit being adapted to navigate the vehicle on the basis of the motion parameters such that the actual movement of the vehicle approximates the target movement; and classifying the detected obstacle on the basis of the measured data in order to deduce the behavior of the obstacle thereof.

33. The method according to claim 32, wherein classifying the obstacle comprises:
determining, if the obstacle is a stationary object, a moving and cooperating object, or a moving and non-cooperating object based upon the sensor data.

34. The method according to claim 32, further comprising:
computing motion parameters for the exit path dependent upon the relative position and the relative velocity of the most dangerous obstacle and dependent upon the result of the classification; and
providing motion parameters for the interface of the autopilot unit.

35. A method for detecting obstacles and for computing an avoidance maneuver in a vehicle, the method comprising:
locating an obstacle using a first environmental sensor and providing corresponding sensor data representing the relative position and relative velocity of the obstacle;
processing the sensor data and providing measured values for the relative position and for the relative velocity;
computing motion parameters for a target movement of an avoidance maneuver based upon the measured values;
applying the motion parameters to an interface of an autopilot unit for controlling the movement of the vehicle, the autopilot unit being adapted to navigate the vehicle on the basis of the motion parameters such that the actual movement of the vehicle approximates the target movement; and
computing motion parameters for an emergency avoidance maneuver, if the distance of an obstacle is lower than a critical distance.

36. The method according to claim 35, further comprising:
measuring a distance, an azimut angle, an elevation angle, and the relative velocity of the obstacle, wherein the distance, the azimut angle, and the elevation angle represent the relative position of the obstacle in front of the vehicle.

37. The method according to claim 35, wherein the first environmental sensor is an optical sensor providing an image of the environment, the method further comprising:
providing sensor data of a second environmental sensor being implemented as a radar sensor.

38. The method according to claim 37, further comprising:
conflating of sensor data of the optical sensor and of the radar sensor and computing the Azimut Angle, the elevation angle, the distance, and the relative velocity of the obstacle from the information comprised in the sensor data.

39. The method according to claim 36, further comprising:
projecting the relative position of an obstacle in a horizontal plane in order to determine the horizontal distance;
providing the horizontal distance as a measured value for the relative position.

40. A method for detecting obstacles and for computing an avoidance maneuver in a vehicle, the method comprising:
locating an obstacle using a first environmental sensor and providing corresponding sensor data representing the relative position and relative velocity of the obstacle, wherein the first environmental sensor is an optical sensor providing an image of the environment;
processing the sensor data and providing measured values for the relative position and for the relative velocity;
computing motion parameters for a target movement of an avoidance maneuver based upon the measured values; and
applying the motion parameters to an interface of an autopilot unit for controlling the movement of the vehicle, the autopilot unit being adapted to navigate the vehicle on the basis of the motion parameters such that the actual movement of the vehicle approximates the target movement;
detecting potential obstacles on the pictures based upon sensor data of area scan camera;
approximately determining the relative position of the obstacle with respect to the vehicle on the basis of the sensor data of the area scan camera;
sorting the detected obstacles according to their danger with respect to given criteria and selecting the most dangerous obstacle;
swinging the radar sensor in the direction of the most dangerous obstacle on the basis of the approximately determined relative position; and
measuring the relative position using the radar sensors with higher accuracy than the approximately determined relative position;
conflating of sensor data of the optical sensor and of the radar sensor and computing the Azimut Angle, the elevation angle, the distance, and the relative velocity of the obstacle from the information comprised in the sensor data; and
providing sensor data of a second environmental sensor being implemented as a radar sensor.

41. The method according to claim 40, wherein the relative position of the respective obstacle serves as criterion for the danger of an obstacle, wherein the one obstacle is selected to be most dangerous, whose distances toward the center of the circular exit path is least.

* * * * *